Jan. 24, 1939. B. G. CARLSON 2,144,616
REMOTE CONTROL MEANS FOR AIRPLANE AUTOMATIC PILOTS
Filed May 9, 1936 2 Sheets-Sheet 1
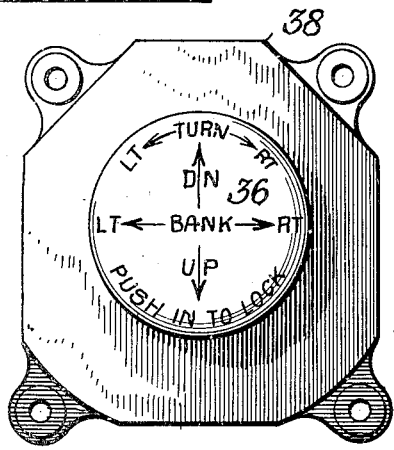
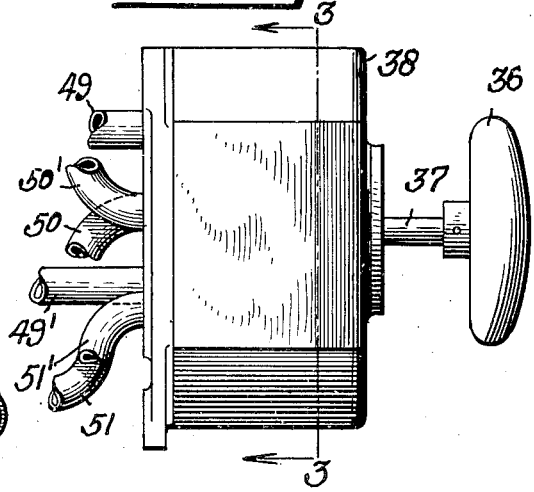
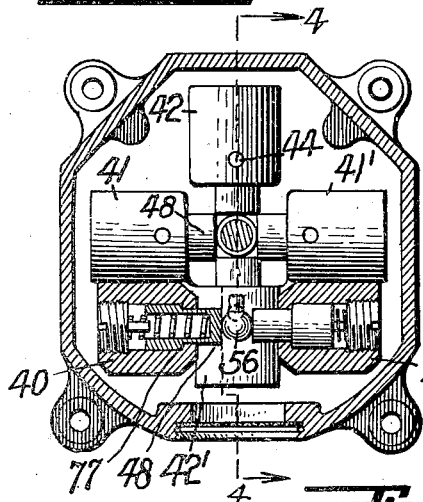
INVENTOR
BERT G. CARLSON
BY
Herbert H. Thompson
HIS ATTORNEY.

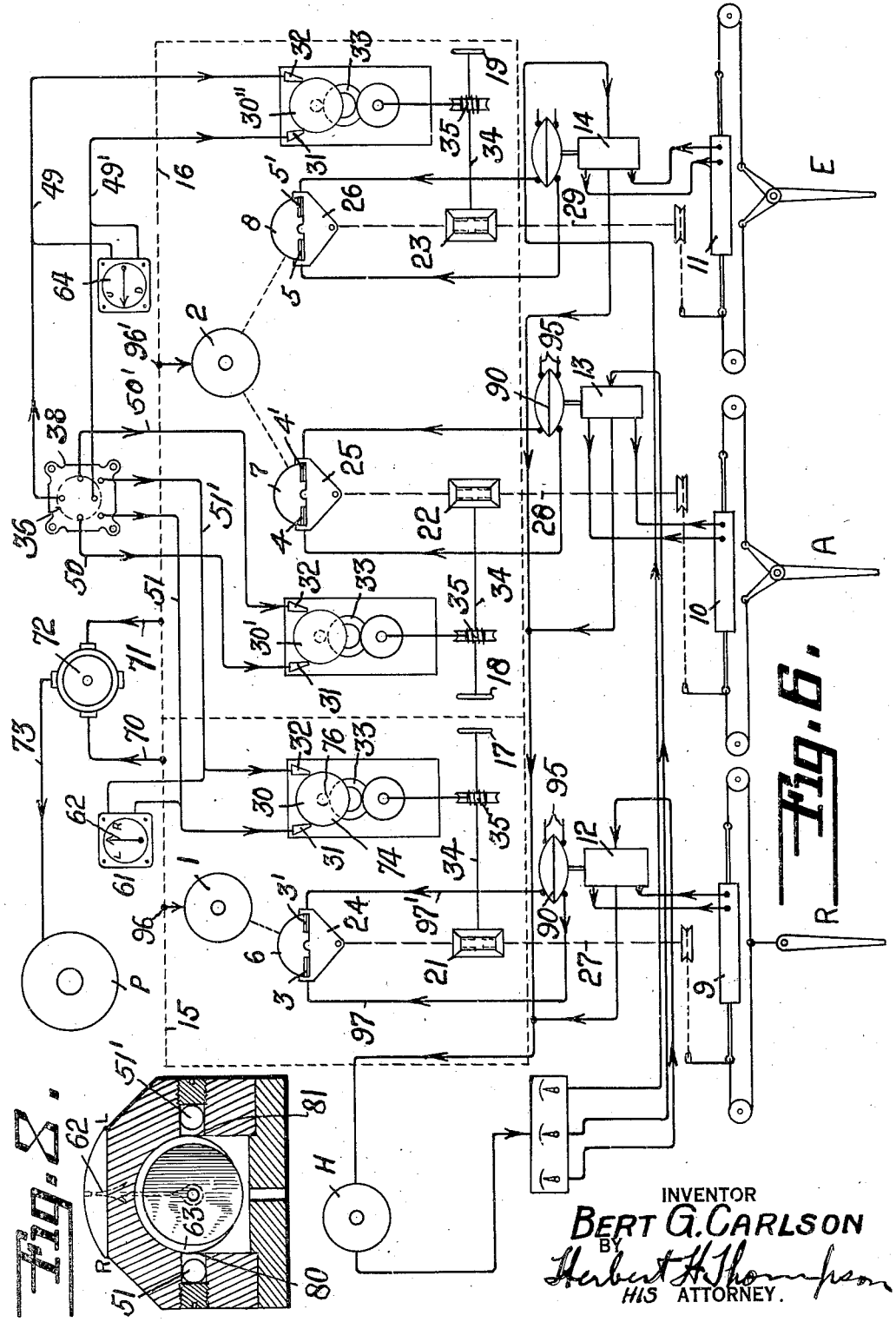

Patented Jan. 24, 1939

2,144,616

UNITED STATES PATENT OFFICE 2,144,616

REMOTE CONTROL MEANS FOR AIRPLANE AUTOMATIC PILOTS

Bert G. Carlson, Freeport, N. Y., assignor to Sperry Gyroscope Company, Inc., Brooklyn, N. Y., a corporation of New York Application May 9, 1936, Serial No. 78,787

11 Claims. (Cl. 244—79)

This invention relates to automatic pilots for aircraft and, more especially, to a remote control for such pilots so that the pilot itself may be situated anywhere on the aircraft, regardless of the position of the aviator. According to my invention, I provide a remotely controlled servo motor system at the pilot which is adapted to be controlled either from a small control handle near the aviator's seat or, if desired, by radio means from the ground.

By my invention I also improve the pneumatic system disclosed in the prior patent to Elmer A. Sperry, Jr., Mortimer F. Bates and applicant, No. 1,992,970, dated March 5, 1935, for Hydraulic-pneumatic automatic pilot, by employing negative air pressure (vacuum system) instead of a positive air pressure system for the pneumatic controls, thereby securing better operation by the fact that clean air is drawn into the instruments before it reaches the pump, instead of after passing through the pump.

Referring to the drawings, showing the preferred form of my invention,

Fig. 1 is a face view of my novel control handle which may be placed, for example, in front of the pilot on the instrument panel or beside the pilot.

Fig. 2 is a side view thereof.

Fig. 3 is a section taken approximately on line 3—3 of Fig. 2.

Fig. 4 is a section taken approximately on line 4—4 in Fig. 3.

Fig. 5 is a rear view of the device.

Fig. 6 is a diagrammatic view showing how my device is used to control the craft in all three planes.

Fig. 7 is a detail showing one form of air turbine that may be controlled from the control handle.

Fig. 8 is a detail, in section, showing how an air control system is applied to a radio direction finder.

My invention is shown as applied to an automatic pilot system such as shown in my prior application Serial No. 32,193, for Homing auto pilot for aircraft, filed July 19, 1935. According to this system, the flight of the aircraft is normally controlled about all three axes by gyroscopes, represented at 1 and 2, the relative turning or tilting of the aircraft with respect to which disturbs differential air flow through pairs of ports 3, 3', 4, 4' and 5, 5' located adjacent the three principal axes of the gyroscopes, the ports being adjacent cut-off plates 6, 7 and 8 secured to the gyroscopes and stabilized thereby. The differential air flow actuates the rudder servo motor 9, aileron servo motor 10 and elevator servo motor 11, respectively, through pneumatically operated hydraulic relays 12, 13 and 14, respectively. The hydraulic pump is shown at H. The air system is preferably of the vacuum type, a vacuum pump P continually exhausting air from the casing or casings containing the two gyroscopes and their master control elements, the casings being represented by the dotted enclosures 15 and 16 in Fig. 6. The air is represented as withdrawn through pipes 70 and 71, pressure reducing valve 72 and pipe 73, leading to the pump P. Clean air at atmospheric pressure enters the enclosures at 96 and 96' for spinning the gyroscopes, at the aforesaid pairs of ports 3, 3', 4, 4' and 5, 5', and at pairs of nozzles 31, 32, hereinafter described. Each pair of ports is connected through pipes 97, 97' to the two sides of the flexible diaphragm 90 of each relay, the said two sides of the diaphragm also being connected to the atmosphere through restricted short pipes 95. It will thus be apparent that as the flow through the ports 3 and 3' is unbalanced by relative tilting of the gyro plate 6 and follow-up plate 24, the pressure on the two sides of the diaphragm 90 will vary, thus actuating the hydraulic end of the relay valve 12, the actual structure remaining the same as disclosed in Fig. 9 of the aforesaid Patent No. 1,992,970.

In the past, it has been customary to cause a change of course or attitude through adjusting knobs 17, 18 and 19 at the gyroscopes, which operate through differentials 21, 22 and 23, respectively, to alter the relative position of the air port plates 24, 25 and 26 with respect to the gyroscopes, the differentials being provided so that the follow-up connection from each control plate may be brought in through shafts 27, 28 and 29, respectively. This system, however, has its limitations since the gyro pilot is often at a distance from the aviator's seat, so that in case he desires to maneuver the plane, he would either have to leave his seat or throw out the gyro pilot and drop back into manual control for changing course or attitude.

According to my present invention, I provide a handle which may be placed directly beside the pilot, remote from the gyro pilot mechanism, and by which he can control the course and attitude of the plane with even greater facility than through the usual manual controls. To this end, I place a small servo motor adjacent each axis of control 24, 25, 26 at the gyroscopes preferably in the form of small air turbines 30, 30', 30'' having pairs of oppositely facing toothed wheels 74 and 75 adapted to be actuated in opposite directions from small air nozzles 31 and 32 within the evacuated gyro box( see Figs. 6 and 7). Each of said turbines drives, through reduction gearing 33, a shaft 34 on which the knob 17 (18 or 19) is mounted, the gearing being shown as double reduction spur gearing including a pinion 76 on the turbine shaft and a worm and worm gear 35 drive to shaft 34. Therefore the rotation of the turbine in either direction will slowly shift the relative position of the control port plate 24.

Each of the three turbines 30, 30' and 30" is preferably controlled from the same master control handle 36. Said handle is shown as mounted on a shaft 37 projecting within a small box 38 which may be closed except for the screened opening 39. Within said box are placed three pairs of opposing control valves 40, 40', 41, 41' and 42, 42'. Each valve is shown as having a longitudinal bore 43 and cross bore 44. A hollow piston 45 or slide valve is shown as slidably mounted in the longitudinal bore and is normally pressed outwardly by compression spring 46 to seat against shoulder 77, said spring bearing at its outer end against threaded closure 47 and at its inner end against the closed end 48 of the small piston. When the pistons are in the position shown in Figs. 3 and 4, the two sides of the bore 44 are cut off from each other. One side is shown as freely opening to the interior of the casing 38 and the other is connected to a pipe which is connected to the proper nozzle 31 or 32 on the proper air motor at the gyro pilot. Preferably, the vertically displaced valves 42 and 42' control the cut-off plate 26 which governs the elevator plane E, while the laterally displaced valves 41 and 41' govern the plate 25 controlling the ailerons A, while the third pair of valves 40 and 40' govern the plate 24 controlling the rudder R. Therefore the pipes 49 and 49' connected to valves 42 and 42', lead from the casing 38 to the respective nozzles on air turbine 30"; while the pipes 50 and 50' from valves 41, 41' lead to nozzles on the air turbine 30', while the pipes 51 and 51' from the valves 40 and 40' lead to the nozzles 31 and 32 on air motor 30.

The shaft 37 of the handle 36 is shown as universally mounted within the casing 38 by being keyed to a ball 52, through which it passes, and which is journaled in a spherical bearing formed between inward extension 53 of the casing and a bearing gland 54. Said shaft may not only be wabbled in any direction with the ball as the pivotal bearing thereof, but it may be slid to the right or left in Fig. 4 and may also be rotated on its own axis, rotating the ball with it. The shaft is shown as having secured thereto, adjacent its lower end, a sleeve 55 having a knob-shaped end against which bear the inner ends of the four piston valves 48 of the four valves 41, 41' and 42, 42'. Therefore, if the knob be moved up or down in the plane of the paper in Fig. 4, one of the valves 42 or 42' will be pushed inwardly. Since air is being withdrawn from the gyro casings, thus reducing the pressure at each of the nozzles, the opening of one of the valves will permit air to enter the connected pipe and pass out through the connected nozzle to drive the air turbine in one direction. Similarly, if the knob is moved in the reverse direction, air will be admitted through the other pipe 49' to drive the air turbine in the opposite direction. Also, it will be apparent that if the knob is moved to the right or left in Figs. 1 and 3, the valves 41, 41' will be moved to operate the aileron control air turbine 30'.

For operating the azimuth gyro turbine 30, the ball 52 is shown as provided with a downwardly extending knob 56 which lies between the adjacent ends 48 of the pistons of valves 40 and 40' (see Fig. 3). Therefore, if the knob 36 be grasped and twisted to rotate shaft 37 on its own axis, one of these valves will be moved to operate the air motor 30 in the direction desired to turn the craft to the right or left, according to the direction of twist. As shown in Fig. 1, the handle 36 may be marked so as to indicate the movements that should be given to the same to secure right or left turn, up or down movement, or right or left bank. When the handle is not being used, it may be locked in position by pushing the same in so that the slotted end 58 of the shaft 37 enters a recess 59 in the bottom of the casing 38, and a cross pin 60 therein enters the slot 58. In this position it is obvious that the handle can neither be wabbled nor turned on its own axis. A spring pressed ball 78 may be used to yieldingly hold the knob in either its operative or inoperative position by engaging shallow recesses 79 in shaft 37.

As indicated above, it is obvious that the device may be used in air craft also equipped for radio control from a distance in accordance with the system more completely described and broadly claimed in my aforesaid copending application No. 32,193. In such case, the radio control would operate, preferably, through the same air turbines 30, 30', 30" and in this case the air lines to the nozzles 31 and 32 would branch and also lead to radio control relays. For control in azimuth, relay 61 is placed in pipes 51 and 51'. Said relay may be in the form of a radio direction indicator or homing device, as explained more fully in my aforesaid application. In this case, the indicator pointer 62 may also carry a cam-shaped valve 63 which differentially opens and closes the ports 80 and 81 connected to the pipes 51, 51'. Similarly, a landing beacon receiver indicator 64 which operates from a landing radio beam may be connected into the pipes 49, 49' controlling the air motor 30". Therefore my device is equally well adapted to either remote hand or radio control and a combination of the two.

Preferably, the control handle is mounted beside the pilot in a vertical position, so that Fig. 1 is a plan view. In this position, it will be seen, the control knob is operated quite similarly to the joy stick on an aircraft, the control knob being moved forward and back for downward and upward pitching, respectively, and right and left for right and left bank, respectively. In this position, also, the knob is rotated about its own axis in the direction that it is desired to turn the plane, so that all movements thereof are in the natural direction of the desired change of course or attitude.

It is also apparent that my control handle is applicable to an airplane equipped with a servo motor system, but without a complete automatic pilot system. In other words, my control handle could be used to operate the main servo motors 9, 10 and 11 through means such as relays 12, 13 and 14 without either of the automatic control units contained within the boxes 15 and 16, since the relays 12, 13 and 14 are controlled by the relative air pressure on the two sides of the diaphragms 90, air being normally equally withdrawn from or supplied to both sides of the diaphragm by suitable pairs of openings 95, 95' and 95". For further details of these valves, reference may be had to the prior patent of applicant and Elmer A. Sperry, Jr., and Mortimer F. Bates, No. 1,992,970, dated March 5, 1935 (see Figs. 9, 10 and 11).

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic steering gear for aircraft having a directional gyroscope for maintaining a straight course in azimuth, a reversible pneumatic servo motive means at said gyroscope for altering the course maintained thereby, dual control means for said servo means one of which is adapted to be actuated manually on the craft, and the second of which includes a radio direction finder, and a pneumatic pick-off thereon for controlling said servo means therefrom.

2. In an automatic steering gear for aircraft having a gyroscope for maintaining straight line flight and a radio direction indicator, a servo motor at the gyroscope for altering the course, a pick-off operated from said direction indicator for controlling said motor to cause flight toward a selected sending station, and an alternative hand operated device for controlling said motor to alter the course at will.

3. A universal master controller for airplanes controlled by fluid operated servo motors comprising a knob, having a stem, a casing in which said stem is mounted for rocking right or left, and forward or backward, and for twisting about its own axis, remotely located servo motors for directly or indirectly operating the several control surfaces to cause banking, pitching and turn, and three groups of fluid control devices within said casing and closely positioned about said stem, and having moving parts thereof substantially abutting said stem so as to be actuated respectively by the three named movements thereof, the first of said groups controlling the bank motor, the second the pitch motor, and the third the rudder motor.

4. A universal master controller for airplanes as claimed in claim 3, in which said three groups of control devices each comprise a pair of oppositely acting sliding valves and a source of fluid pressure for controlling the said servo motors directly or indirectly from said valves.

5. In a gyro pilot of the pneumatic type for dirigible craft, an enclosure for the gyroscope and the air pick-off outflow ports controlled thereby for controlling the operation of the rudder, means for continuously withdrawing air from said enclosure, a differential pressure relay having restricted intakes on the two sides thereof, said ports also being connected to the two sides of said relay to form a pair of intakes into said enclosure, an air motor for changing the relation between the gyroscope and said first named ports also within said casing and having a pair of nozzles or outflow ports, and control intake valves without said casing connected to said nozzles for controlling said motor.

6. In a gyro pilot of the pneumatic type for dirigible craft, an enclosure for the gyroscopes and the air pick-off outflow ports controlled thereby, means for continuously withdrawing air from said enclosure, a differential pressure relay having restricted intakes on the two sides thereof, said ports also being connected to the two sides of said relay to form a pair of intakes into said enclosure, a course change air motor also within said enclosure, and a control valve therefor without the enclosure and adapted to admit atmospheric air thereto to drive the same in either direction.

7. In a gyro pilot of the pneumatic type for dirigible craft, an enclosure for the gyroscopes, a plurality of pairs of air pick-off outflow ports controlled thereby, means for continually withdrawing air from said enclosure, differential pressure relays having restricted intakes on the two sides thereof, said pairs of ports being connected to the two sides of each relay to form intakes into said enclosure, a plurality of air motors within said enclosure for changing the course and attitude of the airplane about each axis, a plurality of control valves for said motors without the enclosure, and a handle for operating said valves.

8. In an automatic steering gear for aircraft having gyroscopic means for maintaining straight line flight in elevation and azimuth, and radio direction indicators in elevation and azimuth, servo means at the gyroscopic means for altering the course in elevation and azimuth, sensitive pick-off means at each indicator for controlling said servo means to cause descent near or turns toward the sending stations, a manual controller on the aircraft, and pick-off means operated thereby for operating said servo means selectively to alter the course or attitude at will.

9. In an automatic pilot for aircraft having position maintaining means in both azimuth and elevation, servo means at the pilot for altering the controls from both the azimuth and elevation positional means to change course and attitude, a homing radio device and a radio landing beam device on the craft, pick-off means on each device for actuating the proper servo means to steer the craft to and down at the sending station, an auxiliary universal control handle on the craft, and controls thereat for also operating either of said servo means.

10. In an automatic pilot for aircraft having position maintaining means in both azimuth and elevation, air motors at the pilot for altering the controls from both the azimuth and elevation positional means to change course and attitude, a homing radio device and a radio landing beam device on the craft, differential air pressure pick-offs on each device for actuating the proper air motors to steer the craft to and down at the sending station, an auxiliary universal control handle on the craft, and differential air pressure pick-offs thereat for also operating either of said air motors in either direction desired.

11. The combination with an automatic pilot for aircraft, of means for changing the course or attitude of the craft about any or all of the three principal axes desired, from a point remote from said pilot, comprising a supporting casing, a handle mounted therein for universal rocking movement and also for axial rotation, three pairs of opposed valves mounted within said casing and having their moving elements abutting said handle and constructed and arranged to be actuated by rotation of said handle about one transverse axis, another pair being actuated by rotation about another transverse axis, and the third pair being actuated by axial rotation of said handle, three remotely located reversible air motors controlled respectively by said pairs of valves and each connected to alter the relationship between the pilot and the craft about the said respective principal axis.

BERT G. CARLSON.